(No Model.)

W. H. RATCLIFF.
BELT FASTENER.

No. 455,056. Patented June 30, 1891.

Witnesses
Oscar A. Michel
R. E. Powell

Inventor
William Hencry Ratcliff,
By Drake & Co. Atty's

UNITED STATES PATENT OFFICE.

WILLIAM HENERY RATCLIFF, OF NEWARK, NEW JERSEY.

BELT-FASTENER.

SPECIFICATION forming part of Letters Patent No. 455,056, dated June 30, 1891.

Application filed November 20, 1890. Serial No. 371,997. (No model.)

*To all whom it may concern:*

Be it known that I, WILLIAM HENERY RATCLIFF, a subject of the Queen of England, residing in Newark, in the county of Essex and State of New Jersey, have invented certain new and useful Improvements in Belt-Fasteners; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to enable the ends of belts for driving-pulleys of machinery to be united more perfectly than by the fasteners heretofore employed, to obtain a more even movement of the belt at the union of the ends over the pulleys, to prevent the fasteners from tearing out rapidly, and thus to increase the durability of the belt, and to secure other advantages and results, some of which will be hereinafter described.

The invention is adapted more particularly for narrow belts for comparatively small machinery, where great tensile strength is required, although it may be used with great advantage on wide belting.

The invention consists in the improved pulley-belt fastener and in the arrangements and combinations of parts, substantially as will be described, and finally embodied in the claim.

Figure 1:
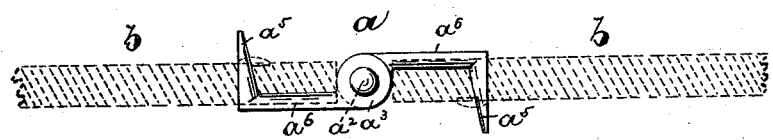
Figure 2:
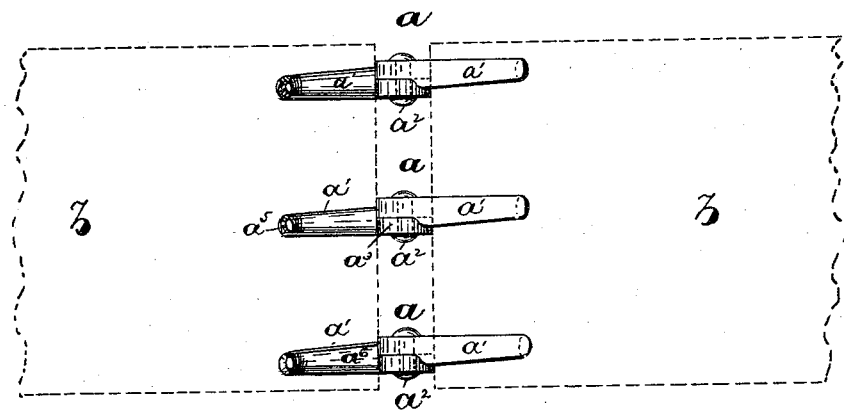
Figure 3:

Referring to the accompanying drawings, in which like letters indicate corresponding parts in each of the figures, Figure 1 is a side elevation of the improved fastener, the relation of the same to the belt being illustrated by indicating the ends of the belt in outline; and Fig. 2 is a plan showing a series of said fasteners and in like manner indicating the location of the belt ends. Fig. 3 indicates in detail one of the hinged parts of the device.

In said drawings, $a$ indicates the fasteners, and $b$ $b$ the ends of the belt united by said fasteners. Said fasteners consist of hinged sections $a'$ $a'$, united by a rivet $a^2$, which holds the sections in permanent relation to one another when disconnected from the belt, the said sections being flattened at their ends $a^3$, forming disk-like hubs, which flattened parts are perforated, as at $a^4$, to receive the hinge-pins and are held close together permanently thereby. At their opposite ends the said sections $a'$ are provided with fingers $a^5$, which extend at right angles to the longitudinal parts $a^6$, so as to pass through suitable perforations provided in the belt back from the extremities thereof. The said fingers are of malleable metal, and are thus adapted to be bent down onto the belt, forming a hook, and to thus hold the fastener to the belt ends, the two sections thus serving to hold the said ends together, as will be understood. The parts $a^5$ $a^6$ are preferably flat in cross-section to present a broad bearing to the leather and to lie close thereto, and thus to prevent tearing and to avoid presenting high projections to the pulley; but said parts are not so flat and thin as they would be were the device formed from sheet metal. On the other hand, the said parts $a^5$ $a^6$ have rounded edges on the side toward the leather, so as not to cut the same, and at the center are comparatively thick, so as to secure increased tensile strength. At the angles the thickness of the metal is increased, and thus the hooks are prevented from straightening out when tension is brought to bear. The disk $a^3$ is not formed by bending the metal into the form of a loop, but by boring or casting a pivot-hole at the center, and thus there is no danger of straightening at this point.

The fingers $a^5$ extend through the belt in opposite directions, as indicated in Fig. 1, and the parts $a^6$ in each fastener lie on opposite sides of the belt, and thus the strain is rendered less severe and the liability to tear out reduced.

The parts $a'$ each have single hooks, or the hooks at opposite ends of the device are not in series, and thus on narrow belts the hooks can be disposed at the opposite edges of the belt where the draft is most severe and at any desired intermediate points, and because of the roundness of the hooks $a^5$ the leather need be perforated but very little to allow the insertion, the said hook being wedge-shaped to spread the perforation without tearing and thus weakening the leather, as will be understood.

As the fastened belt moves around the pulley the sections work on their hinge-pins to conform to the curve, and this further conduces to durability by reducing the strain on the leather of the belt, and also secures a more even movement, as will be apparent.

Having thus described the invention, what I claim as new is—

The improved belt-fastener herein described, combining the oppositely-hooked sections $a'$ $a'$, having the flattened parts $a^5$ $a^6$, rounded on their inner sides and thicker at their longitudinal centers, and having centrally-perforated unjointed disks riveted together by a hinge-pin, substantially as set forth.

In testimony that I claim the foregoing I have hereunto set my hand this 5th day of November, 1890.

WILLIAM HENERY RATCLIFF.

Witnesses:
CHARLES H. PELL,
OSCAR R. MICHEL.